UNITED STATES PATENT OFFICE.

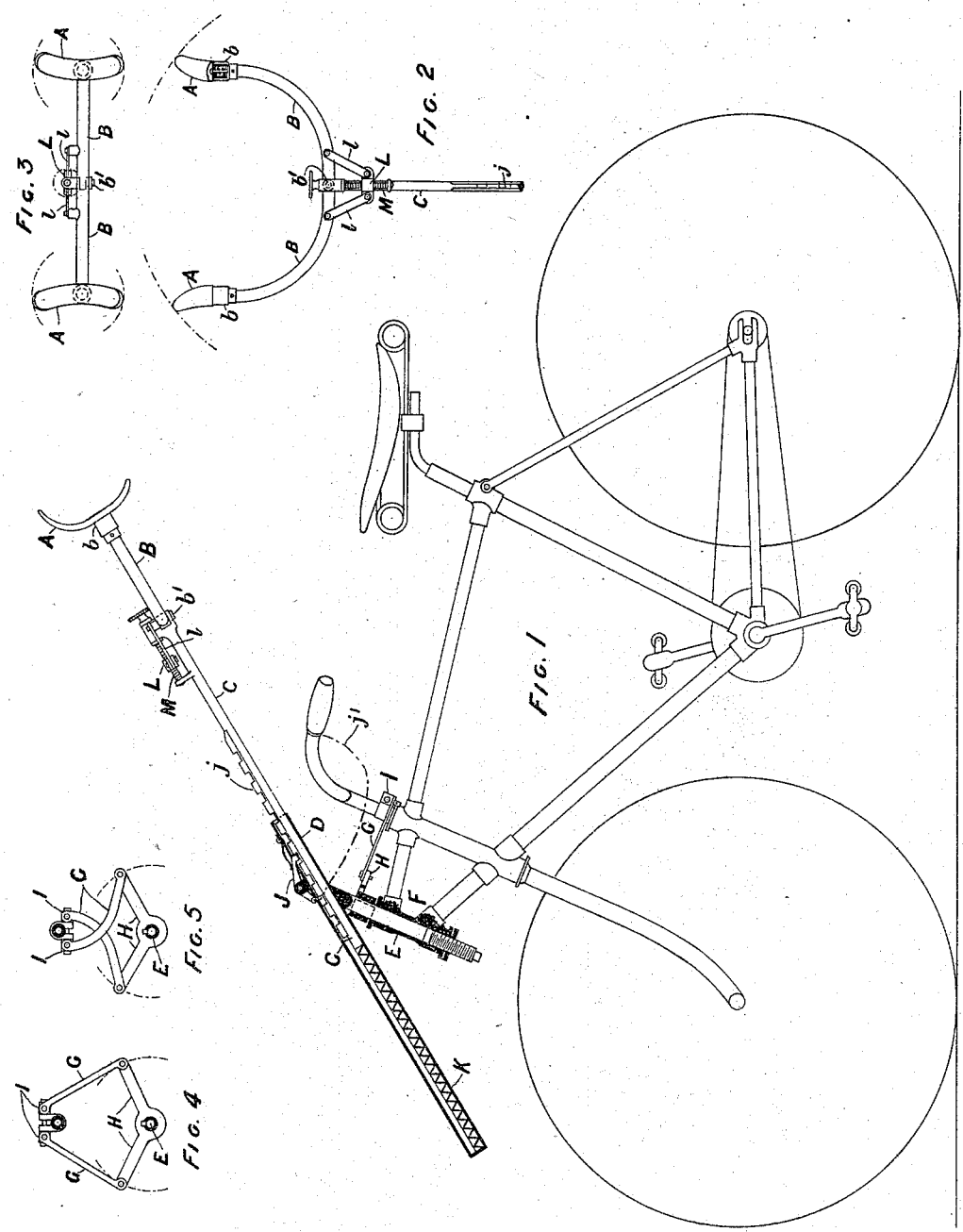

WILLIAM FREDERICK WILLIAMS, OF LONDON, ENGLAND.

BICYCLE AND TRICYCLE.

SPECIFICATION forming part of Letters Patent No. 559,244, dated April 28, 1896.

Application filed March 25, 1895. Serial No. 543,171. (No model.) Patented in Germany March 5, 1895, No. 83,423.

*To all whom it may concern:*

Be it known that I, WILLIAM FREDERICK WILLIAMS, gentleman, of 32 Shaftesbury Avenue, London, W., England, have invented new and useful Improvements in Bicycles and Tricycles, (for which I have obtained a patent in Germany, No. 83,423, dated March 5, 1895,) of which the following is a full, clear, and exact description.

My invention relates to an improvement in bicycles and tricycles, which has for its object to promote the development of the rider's chest, to enable the muscles of the body to coöperate to greater advantage with those of the legs in the propulsion of the machine, and to enable the machine to be steered in ordinary straightforward running by the shoulders or upper part of the body without the concurrence of the hands, so as to leave the latter at liberty whenever desired.

The invention consists in the novel construction and combination of the several parts, as will be hereinafter fully set forth, and pointed out in the claims.

The invention is illustrated as applied to a bicycle in the accompanying drawings, forming part of this specification, wherein—

Figure 1 is a part sectional side elevation of a bicycle provided with my combined shoulder-support and steering mechanism. Figs. 2 and 3 are plan and rear elevation of the shoulder-abutments and the adjustable arms carrying them. Figs. 4 and 5 are plan views of alternative modes of coupling the spindle of the shoulder-supporting device to the steering-fork, so as to enable the steering of the machine to be effected by the relatively small twisting motion of which the rider's body is is conveniently capable without disturbing the rider's position on the saddle.

The same letters of reference indicate the same parts in all the figures.

A A are the shoulder supports or abutments carried by arms B B, attached to an inclined adjustable fore-and-aft rod C, fitted to slide in a guide or bearing D, carried by a spindle E, mounted in bearings on a bracket F, carried by the machine-frame in front of the steering-fork, to which said spindle E is so coupled that the angular motion of the spindle E will be communicated with increased amplitude to the steering-fork, so that a relatively slight motion of the former will move the latter to the extent necessary for steering the machine under ordinary circumstances.

The preferred form of coupling consists of a pair of links G, jointed to the extremities of lever-arms H, turning with the spindle E and to corresponding but shorter arms I, fixed to the steering-fork spindle, these links being either open, as in Fig. 4, or crossed, as in Fig. 5. In the one case the angular motion of the shoulder-supports about the axis E will be in the centrifugal direction, and in the other case in the centripetal direction, when the machine is made to travel in a curve.

The rod C is fixed in its guide D, so as to resist the pressure on the shoulder-supports, by any suitable means. In the example it is shown as provided with a notched rib *j*, with which engages a pawl J, mounted on the bracket D, the rib *j* serving also as a spline to prevent the rod turning in its guide. The guide is continued in the forward direction in the form of a tubular sheath K to receive a spiral spring acting on the lower end of the rod C for the purpose of raising the shoulder-supports automatically to the desired height after the rider has mounted, the pawl J being adapted to lock with the rod C, so as to retain the supports A in the lowered position until the pawl is released by the rider. The pawl is made self-engaging by means of a spring applied to it, and a convenient means of bringing it within reach of the rider's hand for the purpose of disengaging it is a cord *j'*, attached to the tail end of the pawl and carried to any convenient point on the frame of the machine, as shown, so that by this means the shoulder-supports may be lowered nearly down to the handle-bar when mounting and then allowed to move upward and backward until they bear against the rider's shoulders in the desired position. When thus raised, the pawl is allowed to fall into engagement with a notch of the rod C to maintain the shoulder-supports in position to act as a fulcrum or abutment to resist the pull of the rider's hands on the handle-bar.

The supports A are of curved form, adapted to take a fair bearing against the forward part of the shoulders, and each is pivoted in a socket *b* on the end of the arm B, so as to enable it to adjust itself in the circular direction, a spring coiled about the pivot and attached thereto and to the socket tending to always bring the support to the position shown. The arms B are jointed at $b'$ to the head of the rod C, so as to admit of an expanding or contracting motion to suit the breadth of the shoulders, this motion being obtained by a nut or cross-head L, coupled to the arms B by links $l$ and traversed along a screw M, mounted to turn in bearings on the rod C, whereby the adjustment is effected and the arms held rigidly in position.

In order to provide for vertical adjustment of the shoulder-supports to suit the height of the rider, the spindle E is stepped upon an adjusting-screw center at the lower end of its bearing-socket and the levers H are carried by a boss fitting on a squared part of the spindle E or otherwise connected thereto, so as to turn therewith, while allowing the spindle to slide through the boss when effecting the adjustment.

It will be evident that other means of transmitting angular motion from spindle E to the steering-fork may be adopted in lieu of the lever and link connections shown.

I claim—

1. In a bicycle or tricycle, the combination with the steering-fork spindle, of abutments or supports adapted to resist the forward pressure of the shoulders and to enable the steering of the machine to be effected by a twisting motion of the body, said supports being carried by a fore-and-aft rod mounted adjustably on a spindle parallel to the steering-head and coupled to the steering-head by lever-arms and links, the lever-arms being so proportioned that the angular motion of the spindle will be transmitted with increased amplitude to the steering-fork, substantially as and for the purpose specified.

2. In the herein-described combined shoulder-support and steering device, the self-adjusting shoulder-abutments pivoted to arms which are themselves pivoted so as to expand laterally to suit the breadth of the shoulders, the adjustment and locking of the arms being effected by a screw motion as described.

3. In a bicycle or tricycle, the combination with a steering-fork spindle, of a second spindle mounted to turn independently of the steering-fork spindle, a guide carried by the said second spindle at its upper end and inclining forwardly and downwardly, an inclined rod carrying shoulder supports or abutments at its upper end and adjustably secured in the said guide, the movement of the said rod imparting movement to the said second spindle, and an intermediate connection between the said second spindle and the steering-fork spindle, whereby the motion communicated to the said second spindle is transmitted with increased amplitude to the steering-fork spindle, substantially as and for the purpose set forth.

4. In a bicycle or tricycle, the combination with the steering-fork spindle, of a second spindle mounted in front of the steering-fork spindle, an inclined guide carried by the said second spindle, a rod adjustable in the said guide, shoulder supports or abutments carried by the said rod, means for fastening the rod in the adjusted position, a spring engaging the said rod, and adapted to raise the shoulder-supports automatically when the fastening device is released, and an operative connection between the said second spindle and the steering-fork spindle whereby movement imparted to the second spindle is communicated to the steering-fork spindle, substantially as shown and described.

Signed by the said WILLIAM FREDERICK WILLIAMS.

WILLIAM FREDERICK WILLIAMS.

In presence of—
T. W. KENNARD,
GEO. J. B. FRANKLIN.